(12) United States Patent
Cho et al.

(10) Patent No.: US 10,659,832 B1
(45) Date of Patent: *May 19, 2020

(54) DYNAMIC BITRATE SELECTION FOR STREAMING MEDIA

(71) Applicant: Google LLC, Mountain View, CA (US)

(72) Inventors: Youngsang Cho, Seoul (KR); Sungsoo Lim, Seoul (KR)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,055

(22) Filed: Feb. 11, 2019

Related U.S. Application Data

(63) Continuation of application No. 15/595,879, filed on May 15, 2017, now Pat. No. 10,205,984, which is a
(Continued)

(51) Int. Cl.
*H04L 29/06* (2006.01)
*H04N 21/2662* (2011.01)
(Continued)

(52) U.S. Cl.
CPC ..... *H04N 21/2662* (2013.01); *H04L 65/4084* (2013.01); *H04L 65/4092* (2013.01);
(Continued)

(58) Field of Classification Search
CPC ......... H04L 65/80; H04L 47/10; H04L 47/30; H04L 47/38; H04L 65/4084;
(Continued)

(56) References Cited

U.S. PATENT DOCUMENTS 6,374,288 B1 4/2002 Bhagavath et al.
7,047,308 B2 5/2006 Deshpande
(Continued)

OTHER PUBLICATIONS

Information Technology—Dynamic adaptive streaming over HTTP (DASH)—Part 3: Implementation Guidelines/AMD1: Alignment with ISO/IEG 23009-1:2014 and extensibility; ISO/IEG; Jan. 24, 2014; 10 pgs.
(Continued)

*Primary Examiner* — Oanh Duong
(74) *Attorney, Agent, or Firm* — Lowenstein Sandler LLP (57) ABSTRACT

A method for dynamic bitrate selection for streaming media includes receiving one or more chunks from a first media stream of a plurality of bitrate media streams of a media file at a streaming buffer of the processing device, the plurality of bitrate media streams comprising a first subset of bitrate media streams including the first media stream and a second subset of bitrate media streams having a bitrate higher than a first bitrate of the first media stream. The method further includes monitoring a status of the streaming buffer by determining a buffer duration of the one or more chunks from the first media stream being buffered at the streaming buffer, calculating an expected download time for a subsequent chunk of the media file to be received at the streaming buffer in each bitrate media stream, selecting a bitrate media stream of the second subset of bitrate media streams based on expected download times calculated for the second subset of bitrate media streams and the playing time of the one or more chunks from the first media stream being buffered at the streaming buffer, and downloading the subsequent chunk from the selected bitrate media stream.

20 Claims, 6 Drawing Sheets

Related U.S. Application Data continuation of application No. 13/794,201, filed on Mar. 11, 2013, now Pat. No. 9,654,528.

(51) Int. Cl.
  *H04N 21/234* (2011.01)
  *H04N 21/24* (2011.01)

(52) U.S. Cl.
  CPC ............ *H04L 65/601* (2013.01); *H04L 65/80* (2013.01); *H04N 21/23406* (2013.01); *H04N 21/2402* (2013.01)

(58) Field of Classification Search
  CPC .............. H04L 65/4092; H04L 65/601; H04N 21/23406; H04N 21/2402; H04N 21/2662
  See application file for complete search history.

(56) References Cited

U.S. PATENT DOCUMENTS

| | | | |
|---|---|---|---|
| 7,652,993 | B2 | 1/2010 | van Beek |
| 7,743,183 | B2 | 6/2010 | Virdi et al. |
| 7,783,773 | B2 | 8/2010 | Wu et al. |
| 7,987,285 | B2 | 7/2011 | Melnyk et al. |
| 8,185,591 | B1 | 5/2012 | Lewis |
| 8,205,004 | B1 | 6/2012 | Kaufman et al. |
| 8,218,657 | B2 | 7/2012 | Spilo |
| 8,224,981 | B2 | 7/2012 | Vardi et al. |
| 8,516,144 | B2 | 8/2013 | Hsu |
| 8,539,092 | B2 | 9/2013 | Hristodorescu et al. |
| 9,276,979 | B2 * | 3/2016 | Reza ................ H04N 21/44004 |
| 9,319,458 | B2 | 4/2016 | Watson et al. |
| 9,654,528 | B1 | 5/2017 | Cho et al. |
| 9,917,874 | B2 * | 3/2018 | Luby ................ H04N 21/44209 |
| 10,015,543 | B1 * | 7/2018 | Peterkofsky ..... H04N 21/44222 |
| 10,205,984 | B1 * | 2/2019 | Cho .................... H04L 65/4084 |
| 2003/0061371 | A1 | 3/2003 | Deshpande |
| 2008/0133766 | A1 | 6/2008 | Luo |
| 2009/0282162 | A1 | 11/2009 | Mehrotra et al. |
| 2009/0307367 | A1 | 12/2009 | Gigliotti |
| 2009/0307368 | A1 | 12/2009 | Sriram et al. |
| 2010/0202509 | A1 | 8/2010 | Thompson et al. |
| 2010/0205318 | A1 | 8/2010 | Melnyk et al. |
| 2011/0019976 | A1 | 1/2011 | Park et al. |
| 2011/0023076 | A1 | 1/2011 | Park et al. |
| 2011/0161485 | A1 | 6/2011 | George et al. |
| 2011/0225315 | A1 | 9/2011 | Wexler et al. |
| 2012/0170906 | A1 | 7/2012 | Soroushian et al. |
| 2012/0179834 | A1 | 7/2012 | van der Schaar et al. |
| 2013/0067108 | A1 | 3/2013 | Nooney et al. |
| 2013/0117415 | A1 | 5/2013 | Gilson |
| 2013/0227075 | A1 | 8/2013 | Barnes et al. |
| 2013/0243075 | A1 | 9/2013 | Dalela et al. |
| 2014/0006635 | A1 | 1/2014 | Braness et al. |
| 2014/0215085 | A1 | 7/2014 | Li et al. |
| 2014/0269936 | A1 | 9/2014 | Shivadas et al. |

OTHER PUBLICATIONS

Civanlar et al., "Minimum Delay Content Adaptive Video Streaming over Variable Bitrate Channels with a Novel Stream Switching Solution", Image Processing 2005, IEEE International Conference Sep. 11-14, 2005.

* cited by examiner

DYNAMIC BITRATE SELECTION FOR STREAMING MEDIA

CROSS-REFERENCE TO RELATED APPLICATIONS

This application is a continuation application of co-pending U.S. patent application Ser. No. 15/595,879, filed May 15, 2017, entitled, "DYNAMIC BITRATE SELECTION FOR STREAMING MEDIA," which is a continuation application of U.S. patent application Ser. No. 13/794,201, filed Mar. 11, 2013, entitled "DYNAMIC BITRATE SELECTION FOR STREAMING MEDIA", now issued as U.S. Pat. No. 9,654,528, which is incorporated herein by reference for all purposes.

TECHNICAL FIELD

This disclosure relates to the field of streaming media and, in particular, to dynamic bitrate selection for streaming media.

BACKGROUND

Streaming media is multimedia, such as video and audio content, which is received by and presented to an end-user while being delivered by a streaming provider. With streaming media, a client media player can start playing media content before the entire file has been transmitted from a server, e.g., over a telecommunications network. For example, a user may visit a media streaming website using a web browser running on a personal computing device. The user may play multimedia content, including video and audio portions, in a media player from the media streaming website. The streaming provider may transmit the audio and video portions of the content to the personal computing device over a network, such as the Internet, which may be played back in the media player.

Adaptive bitrate streaming is a technique used in streaming multimedia over computer networks. Most adaptive streaming technologies are based on Hypertext Transfer Protocol (HTTP) and are designed to work efficiently over large distributed HTTP networks such as the Internet. In general, a web browser or media player detects the user's bandwidth in real time and adjusts the quality of a media stream accordingly. The web server or media server providing the media stream uses an encoder to encode a single source file at multiple bitrates. The player client switches between streaming the different encodings depending on available resources. Each of the different bitrate streams may be segmented into small multi-second chunks. The segment size can vary depending on the particular implementation, but they are typically between two (2) and ten (10) seconds. When starting to stream the media data, the client typically requests the chunks from the lowest bitrate stream (i.e., the lowest quality). If the client finds that the current bandwidth can support a higher bitrate, then the client usually request the next higher bitrate chunks. However, when multiple processes (e.g., in the same or different application) are using the network together, it may be difficult to determine how much bandwidth is actually available for streaming the media file.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a bitrate selector on a user device monitors a first stream of a plurality of bitrate media streams of a media file, the first media stream having a first bitrate, these plurality of bitrate media streams comprising a first subset of bitrate media streams including the first media stream and a second subset of bitrate media streams having a bitrate higher than the first bitrate. The bitrate selector calculates an expected download time for a subsequent chunk of the media file in each bitrate media stream of the second subset of bitrate media streams. The expected download time for the subsequent chunk in each bitrate media stream may be based on a size of the subsequent chunk and at least one of a download rate of a previous chunk of the media file and an average download rate of a plurality of previous chunks of the media file. In one implementation, the bitrate selector determines the size of the subsequent chunk by multiplying a playing time of the subsequent chunk and the first bitrate of the first media stream.

The bitrate selector selects a bitrate media stream of the second subset of bitrate media streams for the subsequent chunk based on the expected download times and downloads the subsequent chunk from the selected bitrate media stream. To select one of the plurality of bitrate media streams, the bitrate selector selects a highest bitrate from the second subset of bitrate media streams that is less than or equal to a weighted download rate of the subsequent chunk and for which the estimated download time is less than the buffer duration. The bitrate selector may determine the weighted download rate by applying a weighting value to a download rate of the subsequent chunk, the weighting value based on a stage of the streaming buffer. The bitrate selector may determine the stage of the streaming buffer by comparing the buffer duration of the chunks of the media file stored in the streaming buffer to a plurality of threshold values, where the plurality of threshold values includes at least the first threshold.

BRIEF DESCRIPTION OF THE DRAWINGS

The present disclosure is illustrated by way of example, and not by way of limitation, in the figures of the accompanying drawings.

DETAILED DESCRIPTION

Implementations are described for dynamically selecting a bitrate for streaming media. In one implementation, chunks of a media file are received at a user device and temporarily stored in a streaming buffer. A media server, which provides the chunks, may have several available bitrate streams, where each stream has a different bitrate. The user device can select which bitrate stream to download subsequent chunks from based on the desire for higher quality (e.g., higher bitrate) and the desire to avoid buffering events. In one implementation, the user device includes a bitrate selector to dynamically determine which bitrate stream to download a next chunk from. The bitrate selector may make this determination based on an estimated download time of the subsequent chunk, with the goal of maximizing the quality of the media data while avoiding buffering events.

In one implementation, the bitrate selector calculates an estimated download time for the subsequent chunk of the media file from each bitrate stream in a subset of the bitrate streams having a higher bitrate than the current bitrate. Another subset of bitrate media streams may include the current bitrate and streams having a lower bitrate. The estimated download time may be based on a size of the subsequent chunk and the download rates of previous chunks of the media file. The bitrate selector may select a highest bitrate from the available bitrate media streams that is less than or equal to a weighted download rate of the subsequent chunk and for which the estimated download time is less than the current buffer duration (i.e., the playing time of the chunks stored in the streaming buffer). The download rate may be weighted based on a stage of the current buffer duration.

The bitrate selection methods described herein can allow a user device to download a media file at the highest bitrate (i.e., highest quality) available depending on the currently available network bandwidth. The methods can also minimize the risk of buffering events. A buffering event refers to a situation, in which chunks of a media file that are buffered in a streaming buffer are exhausted before additional chunks of the media file can be downloaded from the media server). The combination of these two factors can significantly increase the user experience when streaming a media file.

Figure 1:
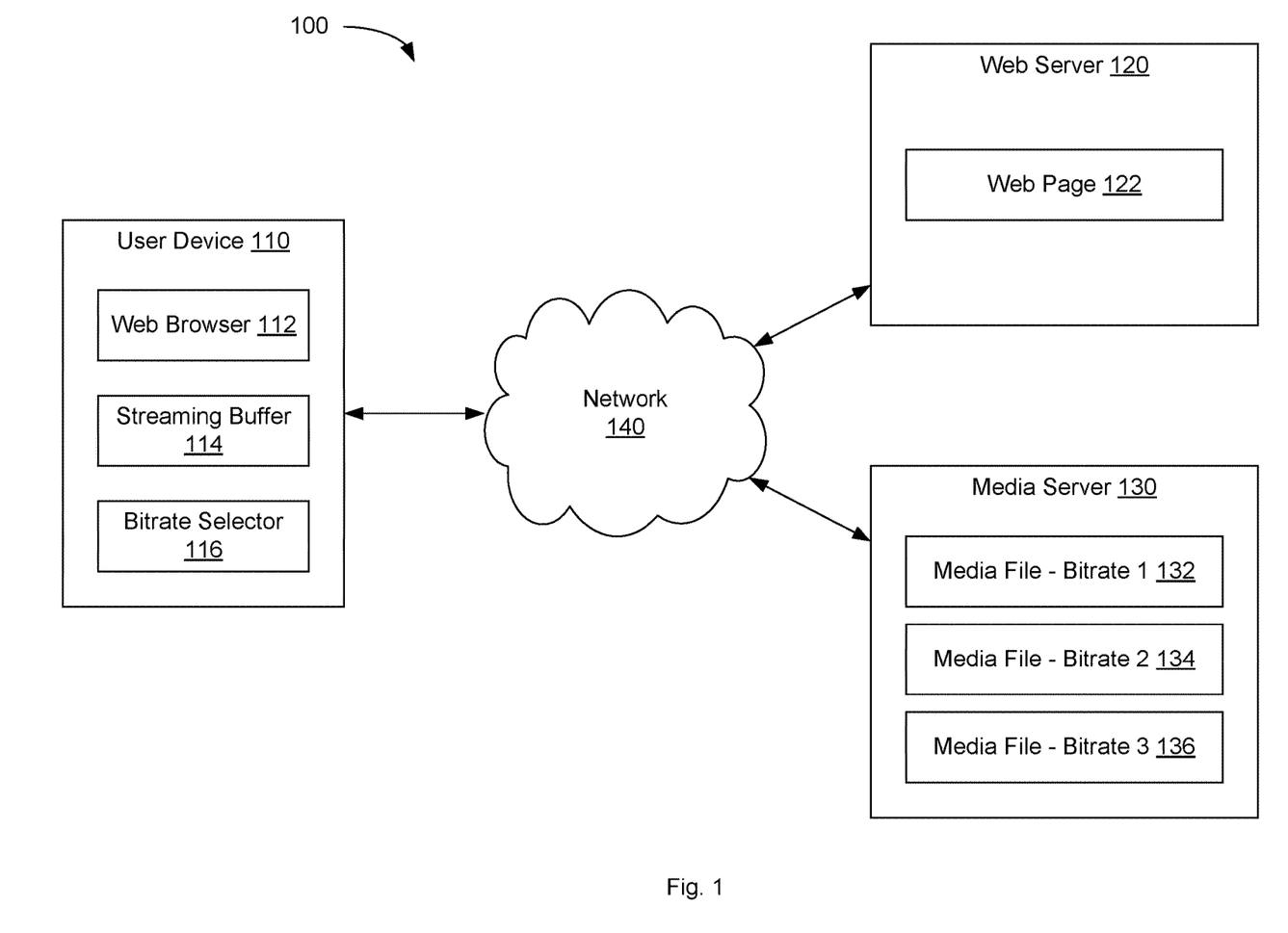
FIG. 1 is a block diagram illustrating an exemplary network architecture in which implementations of the present disclosure may be implemented.

FIG. 1 is a block diagram illustrating an exemplary network architecture in which implementations of the present disclosure may be implemented. The network architecture 100 can include one or more user devices 110 communicating with one or more servers, such as web server 120 and media server 130 over one or more networks 140, according to one implementation. Network 140 can be a local area network (LAN), a wireless network, a telephone network, a mobile communications network, a wide area network (WAN), such as the Internet, or similar communication system. User device 110 may be any type of computing device including a server computer, gateway computer, desktop computer, laptop computer, mobile communications device, cell phone, smart phone, hand-held computer, tablet computer, set-top-box or similar computing device. User device 110 may be variously configured with different features to enable viewing of multimedia content, such as images, videos, songs, etc. User device 110 may be hosted, for example, by computer system 600 of FIG. 6.

Web server 120 and media server 130 may include a network-accessible server-based functionality, various data stores, and/or other data processing equipment. The servers 120 and 130 may be implemented by a single machine or a cluster of machines. As illustrated in FIG. 1, web server 120 and media server 130 are separate devices. In another implementation, however, web server 120 and media server 130 may be combined into a single machine or device. One or both of web server 120 and media server 130 may be hosted, for example, by computer system 600 of FIG. 6. In one implementation, web server 120 hosts web page 122. Web server 120 can deliver web page 122 to user device 110 or another client device using for example the Hypertext Transfer Protocol (HTTP). Web page 122 may be part of, for example, a media content hosting website that allows users to upload, view and share, multimedia content. Media server 130 may be a dedicated computer appliance or a specialized software application designed to store and share media data, such as images, music, video, etc.

In one implementation, media server 130 includes one or more media files encoded at multiple bitrates. For example, the media file may have different bitrates 132, 134, 136. The media file may represent the audio and video content that a user plays through web page 122. For example, when a user of user device 110 views web page 122, using a web browser 112, media player, or other program running on user device 110, and requests to view a certain multimedia content, web server 120 can send a message to media server 130 requesting the media file at one of the multiple bitrates 132, 134, 136. Media server 130 can initiate streaming of the media file to user device 110 via network 140. In one implementation, the media file is a music video file, including both a visual and an audio component. In other implementations, however, the media file may be some other type of media file. In one implementation, user device 110 may additionally include streaming buffer 114. Streaming buffer 114 may include a region of a physical memory storage used to temporarily hold chunks of the media file data while it is being streamed from media server 130 to user device 110. Streaming buffer 114 can be implemented in a fixed memory location in hardware or by using a virtual data buffer, pointing at a location in the physical memory. Streaming buffer 114 may be used when there is a difference between the rate at which the chunks of media data are received and the rate at which it can be processed (i.e., displayed in web browser 112 or a media player).

User device 110 can include a bitrate selector 116 that can dynamically select which of the multiple bitrates 132, 134, 136 to use for streaming subsequent chunks of the media file from media server 130. In one implementation, bitrate selector 116 is part of an operating system of user device 110. Bitrate selector 116 can, for example, publish an application programming interface (API), which can be called by various applications (e.g., web browser 112) to select an appropriate bitrate. In other implementations, bitrate selector 116 can be part of the application used to stream the media file, such as web browser 112. Bitrate selector 116 can select the bitrate based on the buffer duration (i.e., the playing time of the buffered media chunks in streaming buffer 114) and the expected download time of subsequent chunks of the media file. Some implementations of bitrate selector 116 are discussed in more detail below.

Figure 2:
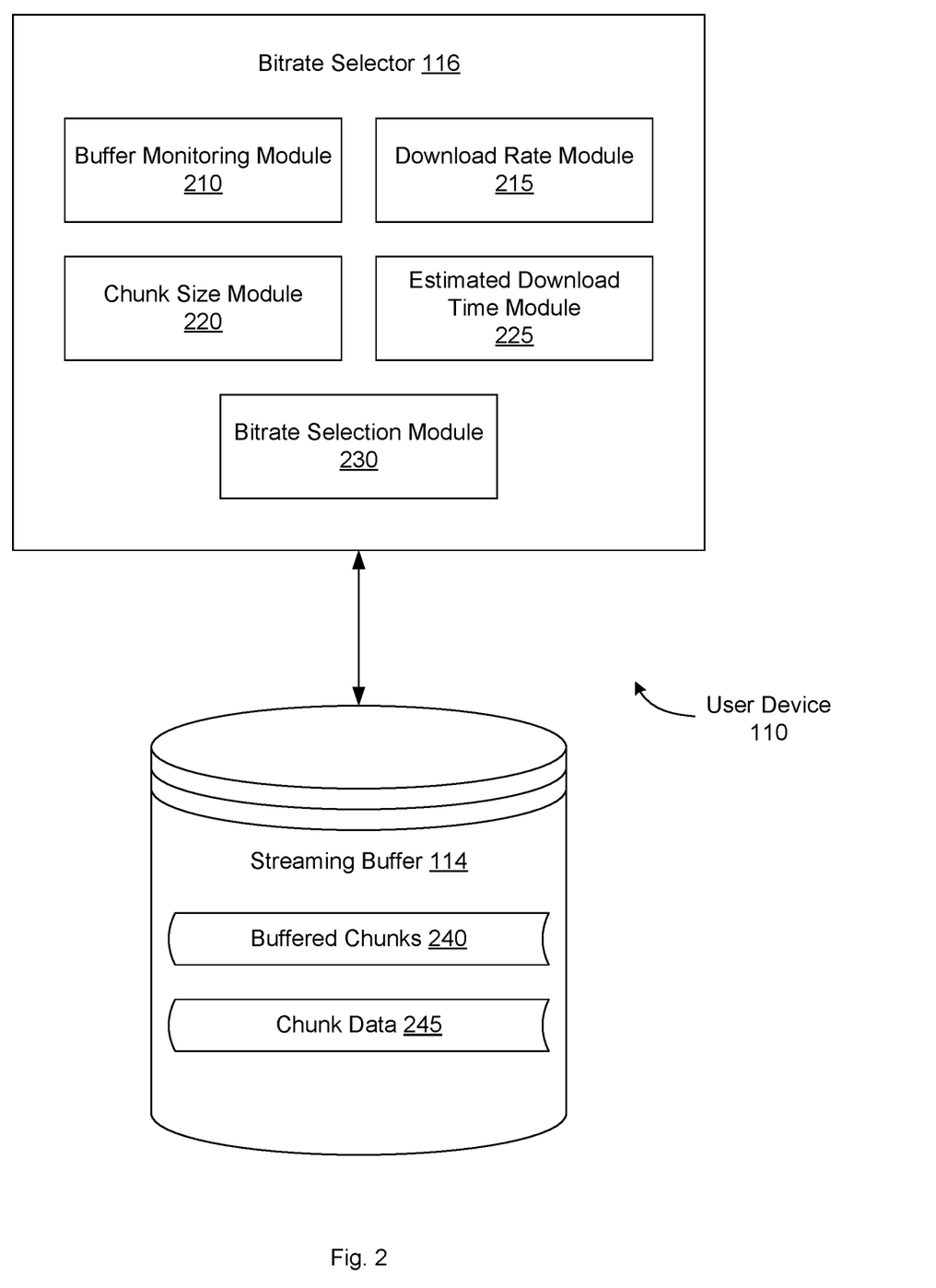
FIG. 2 is a block diagram illustrating a bitrate selector for dynamically selecting a bitrate for streaming media, according to some implementations.

FIG. 2 is a block diagram illustrating a bitrate selector for dynamically selecting a bitrate for streaming media, according to some implementations of the present disclosure. In one implementation, bitrate selector 116 includes buffer monitoring module 210, download rate module 215, chunk size module 220, estimated download time module 225 and bitrate selection module 230. This arrangement of modules may be a logical separation, and in other implementations, these modules or other components can be combined together or separated in further components, according to a particular implementation. In one implementation, streaming buffer 114 is accessible to bitrate selector 116 and includes buffered chunks of media data 240 and media chunk data 245. In one implementation, user device 110 may include bitrate selector 116 and streaming buffer 114. In another implementation, streaming buffer 114 may be external to user device 110 and may be connected to user device 110 over a network or other connection. In other implementations, user device 110 may include different and/or additional components which are not shown to simplify the description. Streaming buffer 114 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one implementation, buffer monitoring module 210 can monitor the status of streaming buffer 114. For example, buffer monitoring module 210 can keep track of the current size or amount of buffered chunks 240 stored in streaming buffer 114 at any given point in time. In one implementation, buffer monitoring module 210 may periodically poll streaming buffer 114 to determine the size of the buffered chunks. In one implementation, buffer monitoring module 210 may also determine the playing time of the buffered chunks 240. This may be referred to, in some cases, as the "buffer duration." In one implementation, the buffer duration may be determined from metadata associated with the buffered chunks 240. For example, the playing time of each chunk may be stored in the metadata and buffer monitoring module may add together the playing times of all the chunks in streaming buffer 114 to determine the buffer duration. In another implementation, each of the buffered chunks 240 may have a fixed duration so that buffer monitoring module 210 can simply count the chunks to determine the buffer duration.

In one implementation, buffer monitoring module 210 can compare the buffer duration to one or more thresholds or bounds to determine a stage of the streaming buffer. In one implementation, there may be a lower bound used to designate an increasing stage. If buffer monitoring module 210 determines that the buffer duration is less than the lower bound, the streaming buffer 114 can be said to be in the increasing stage. In the increasing stage, it may be desirable to increase the buffer duration so as to avoid buffering events while playing the media file. A buffering event can occur when the buffered chunks 240 in the streaming buffer are exhausted (i.e., played) before additional chunks of the media file can be downloaded from media server 130. In another implementation, there may be an upper bound used to designate a decreasing stage. If buffer monitoring module 210 determines that the buffer duration is greater than the upper bound, the streaming buffer 114 can be said to be in the decreasing stage. In the decreasing stage, there is a sufficient amount of buffered chunks 240 to allow the user device 110 to stream the media file at a higher bitrate. This would provide a higher quality media file, but could potentially take longer. It would be unlikely for a buffering event to occur, however, because the buffer duration is sufficiently long. If buffer monitoring module 210 determines that the buffer duration is between the lower bound and the upper bound, it can be said that the streaming buffer 114 is in a maintaining stage. In the maintaining stage, the bitrate will likely remain the same in order to maintain the current buffer duration as more buffered chunks 240 are played (i.e., removed from streaming buffer 114), while new chunks are added from media server 130.

In one implementation, download rate module 215 can determine the download rate of the buffered chunks 240 in streaming buffer 114. The download rate may be determined by dividing a size of the chunk (e.g., measured in bytes) by the download time of the chunk (e.g., measured in seconds). The size and download time may both be stored in metadata associated with a buffered chunk 240, and download rate module 215 can read the metadata and then perform the calculations to determine the download rate. In one implementation, download rate module 215 may store the calculated download rate in the metadata or as part of chunk data 245 in streaming buffer 114. In another implementation, download rate module 215 may also calculate an average download rate for all, or a subset, of the chunks of a media file. Download rate module 215 may also be configured to compare the download rate of a particular chunk to the average download rate to determine a lesser of the two download rates. In one implementation, download rate module 215 can determine and/or update the download rate each time a chunk is received by user device 110 from media server 130.

In one implementation, download rate module 215 may also calculate a weighted download rate for each of buffered chunks 240. The weighting may be based on the stage of the streaming buffer 114, as determined by buffer monitoring module 210. In one implementation, the download rate may be multiplied by a weighting factor or weighting function to determine the weighted download rate. For example, the weighting factor may be 0.5 for the increasing stage, 1.0 for the maintaining stage, and 1.5 for the decreasing stage. These weighting factors are merely examples, and in other implementations, some other values may be used.

In one implementation, chunk size module 220 can determine the estimated size of next (or subsequent) chunk to be received at streaming buffer 114. Chunk size module 220 can determine the chunk size by multiplying the playing time of the chunk (measured in seconds) by the current bitrate being used to download chunks (measured in bits per second). The resulting value may be the size of the subsequent chunk. In one implementation, each chunk has a known fixed playing time (e.g., 2 seconds) and the bitrate can be determined from bitrate selection module 230.

In one implementation, estimated download time module 225 can calculate an estimated download time for a next (or subsequent) chunk to be received at a streaming buffer 114. The estimated download time may be used by bitrate selection module 230 to select an appropriate bitrate. The estimated download time may be based on, for example, the current bitrate, a playing time of the chunk and the download rate of the chunk. If there are multiple bitrates available for selection, estimated download time module 225 may calculate an estimated download time using each of the bitrates (e.g., 132, 134, 136). In one implementation, estimated download time module 225 may divide the size of the subsequent chunk (as determined by chunk size module 220) by the lesser of the download rate of the previous chunk and the average download rate of all prior chunks in the media data file. Estimated download time module 225 may store the calculated download time estimates in chunk data 245.

In one implementation, bitrate selection module 230 may select a bitrate 132, 134, 136 to use to download the subsequent chunk based on the estimated download times calculated by estimated download time module 225. Bitrate selection module 230 may select the highest bitrate which is less than or equal to the weighted download rate (as calculated by download rate module 215), and which has an estimated download time that is less than the current buffer duration (as calculated by buffer monitoring module 210). If no chunks satisfy these conditions, bitrate selection module 230 may select the lowest available bitrate. In one implementation, bitrate selection module 230 may be configured to select or update the bitrate each time a chunk is received by user device 110 from media server 130. In this manner, bitrate selector 116 can download each chunk of the media file at an optimal bitrate so as to avoid buffering events and improve the user experience.

Figure 3:
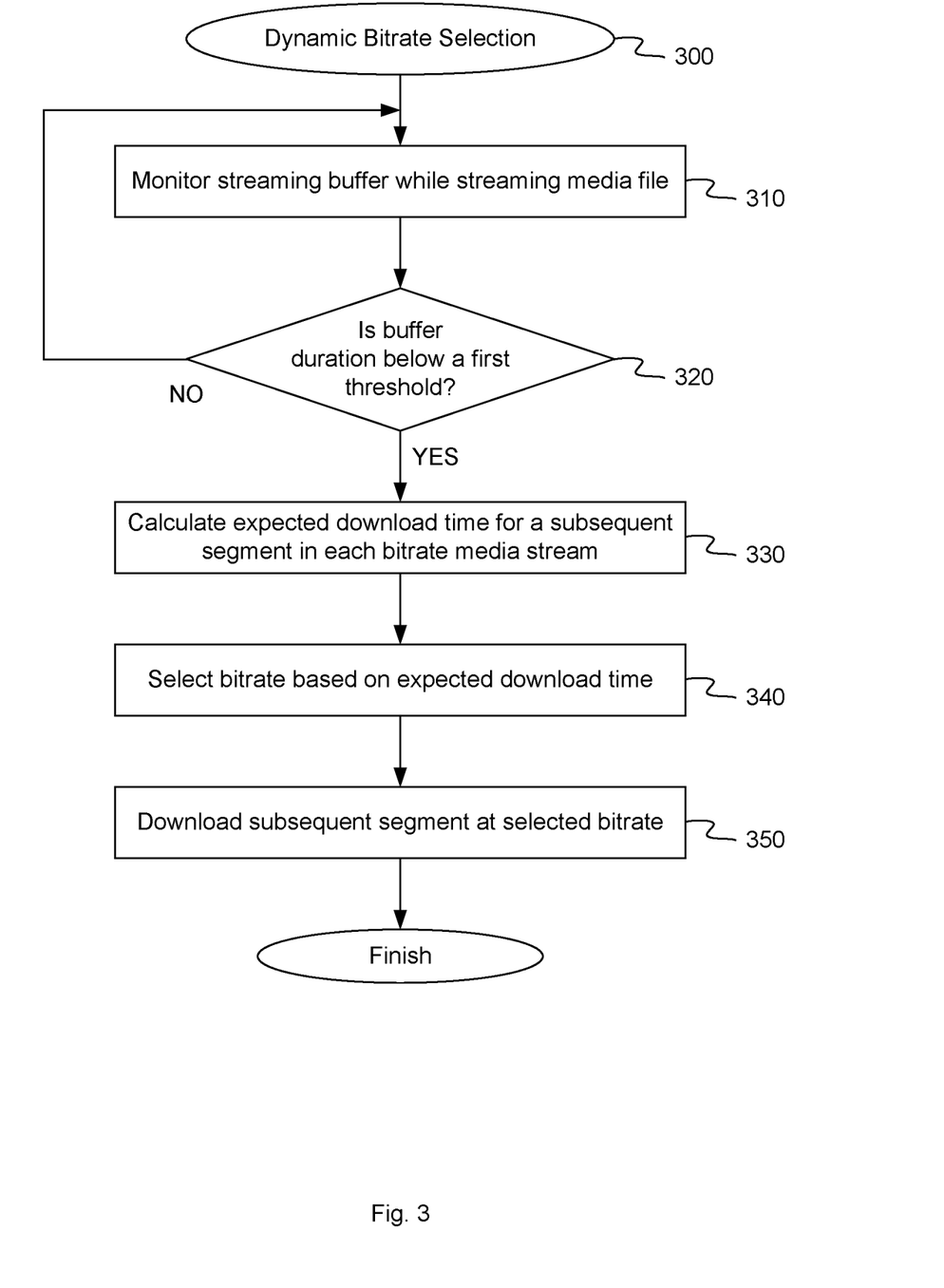
FIG. 3 is a flow diagram illustrating a method for dynamic bitrate selection for streaming media, according to some implementations.

FIG. 3 is a flow diagram illustrating a method for dynamic bitrate selection for streaming media, according to some implementations. The method 300 may be performed by processing logic that comprises hardware (e.g., circuitry, dedicated logic, programmable logic, microcode, etc.), software (e.g., instructions run on a processing device to perform hardware simulation), or a combination thereof. The method 300 can be used to dynamically select one of multiple available bitrates to download a subsequent chunk of a streaming media file. For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by bitrate selector 116, as shown in FIGS. 1 and 2.

Referring to FIG. 3, at block 310, method 300 monitors streaming buffer 114 while user device 110 is streaming a media file from media server 130. In one implementation, buffer monitoring module 210 may periodically poll streaming buffer 114 to determine the buffer duration of the buffered chunks 240. In one implementation, each of the buffered chunks 240 may have a fixed duration so that buffer monitoring module 210 can simply count the chunks to determine the buffer duration.

At block 320, method 300 determines if the buffer duration of the streaming buffer 114 is below a first threshold or bound. In one implementation, buffer monitoring module 210 can compare the buffer duration to one or more thresholds or bounds to determine a stage of the streaming buffer. In one implementation, there may be a lower bound used to designate an increasing stage. If buffer monitoring module 210 determines that the buffer duration is less than the lower bound, the streaming buffer 114 can be said to be in the increasing stage. In the increasing stage, it may be desirable to increase the buffer duration so as to avoid buffering events while playing the media file.

If at block 320, method 300 determines that the buffer duration is not below the first threshold, method 300 may return to block 310 to continue monitoring streaming buffer 114. If at block 320, method 300 determines that the buffer duration is below the first threshold (i.e., that streaming buffer 114 is in the increasing stage), at block 330, method 300 calculates the expected download time for a subsequent chunk (or segment) of the media file in each of the available bitrate media streams 132, 134, 136. Some implementations of how bitrate selector 116 calculates the expected download times are discussed in more detail below with respect to FIG. 4.

At block 340, method 300 selects a bitrate based on the expected download times calculated at block 330. Some implementations of how bitrate selector 116 selects the bitrate are discussed in more detail below with respect to FIG. 5. At block 350, method 300 downloads the subsequent segment at the selected bitrate.

Figure 4:
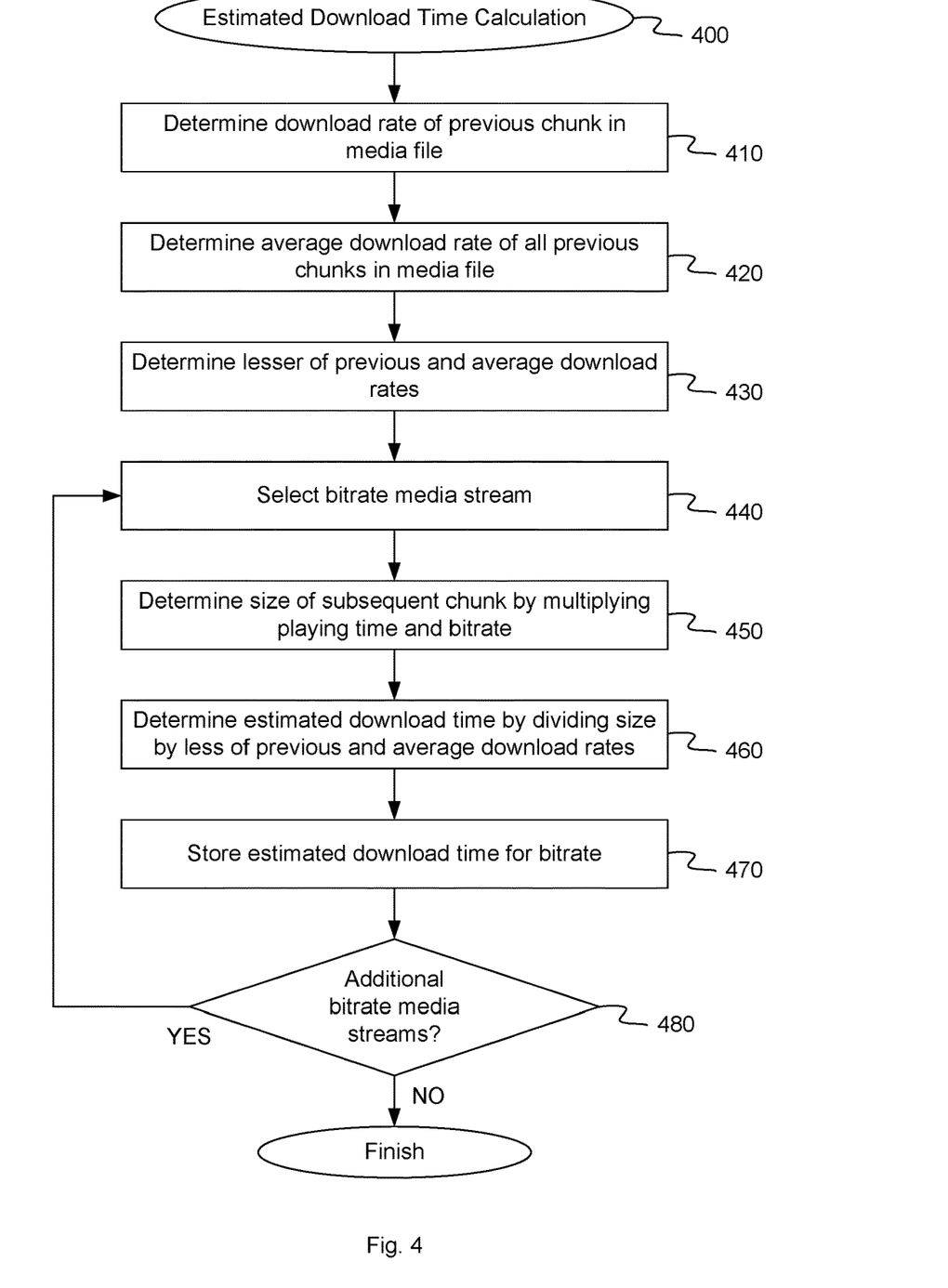
FIG. 4 is a flow diagram illustrating a method for estimated download time calculation, according to some implementations.

FIG. 4 is a flow diagram illustrating a method for estimated download time calculation, according to some implementations. The method 400 may be performed by processing logic that comprises hardware (e.g., circuitry, dedicated logic, programmable logic, microcode, etc.), software (e.g., instructions run on a processing device to perform hardware simulation), or a combination thereof. The method 400 can calculate an estimated download time for a subsequent chunk of a media file at each available bitrate. In one implementation, method 400 may be performed by bitrate selector 116, as shown in FIGS. 1 and 2.

Referring to FIG. 4, at block 410, method 400 determines a download rate of a previous chunk of the media file. In one implementation, download rate module 215 can determine the download rate of the buffered chunks 240 in streaming buffer 114. The download rate may be determined by dividing a size of the chunk (measured in bytes) by the download time of the chunk (measured in seconds). The size and download time may both be stored in metadata associated with a buffered chunk 240, and download rate module 215 can read the metadata and then perform the calculations to determine the download rate.

At block 420, method 400 determines an average download rate of all, or a subset, of the previous chunks in the media file. In one implementation, download rate module 215 may calculate an average download rate for all, or a subset, of the chunks of a media file. The subset may include, for example, some number (e.g., 20) of previous chunks in the media file. In other implementations, download rate module 215 may calculate some other representative download rate, such as the median rate or the mode rate.

At block 430, method 400 determines a lesser of the previous download rate determined at block 410 and the average download rate determined at block 420. In one implementation, download rate module 215 may compare the download rate of a particular chunk (e.g., the most recently download chunk of the media file) to the average download rate of the previous chunks to determine a lesser of the two download rates.

At block 440, method 400 selects a first bitrate stream from the available bitrate streams 132, 134, 136. For example, bitrate selection module 230 may identify a first bitrate stream 132, or some other randomly selected bitrate stream. At block 450, method 400 determines a size of a subsequent chunk by multiplying the playing time of the chunk to the bitrate of the identified stream. In one implementation, chunk size module 220 can determine the estimated size of next (or subsequent) chunk to be received at streaming buffer 114. Chunk size module 220 can determine the chunk size by multiplying the playing time of the chunk (measured in seconds) by the identified bitrate (measured in bits per second). The resulting value may be the size of the subsequent chunk. In one implementation, each chunk has a known fixed playing time (e.g., 2 seconds) and the bitrate can be determined from bitrate selection module 230.

At block 460, method 400 determines an estimated download time for the subsequent chunk at the first bitrate by dividing the size of the subsequent chunk by the lesser of the download rates determined at block 430. In one implementation, estimated download time module 225 can calculate an estimated download time for a next (or subsequent) chunk to be received at a streaming buffer 114. In one implementation, estimated download time module 225 may divide the size of the subsequent chunk (as determined at block 450) by the lesser of the download rates (as determined at block 430). At block 470, method 400 stores the estimated download time for the first bitrate. Estimated download time module 225 may store the calculated download time estimate for this particular bitrate in chunk data 245.

At block 480, method 400 determines if there are additional bitrate media streams. If there are additional bitrate media streams, method 400 returns to block 440, selects another bitrate media stream and repeats the steps at blocks 450-480 for each remaining bitrate media stream.

Figure 5:
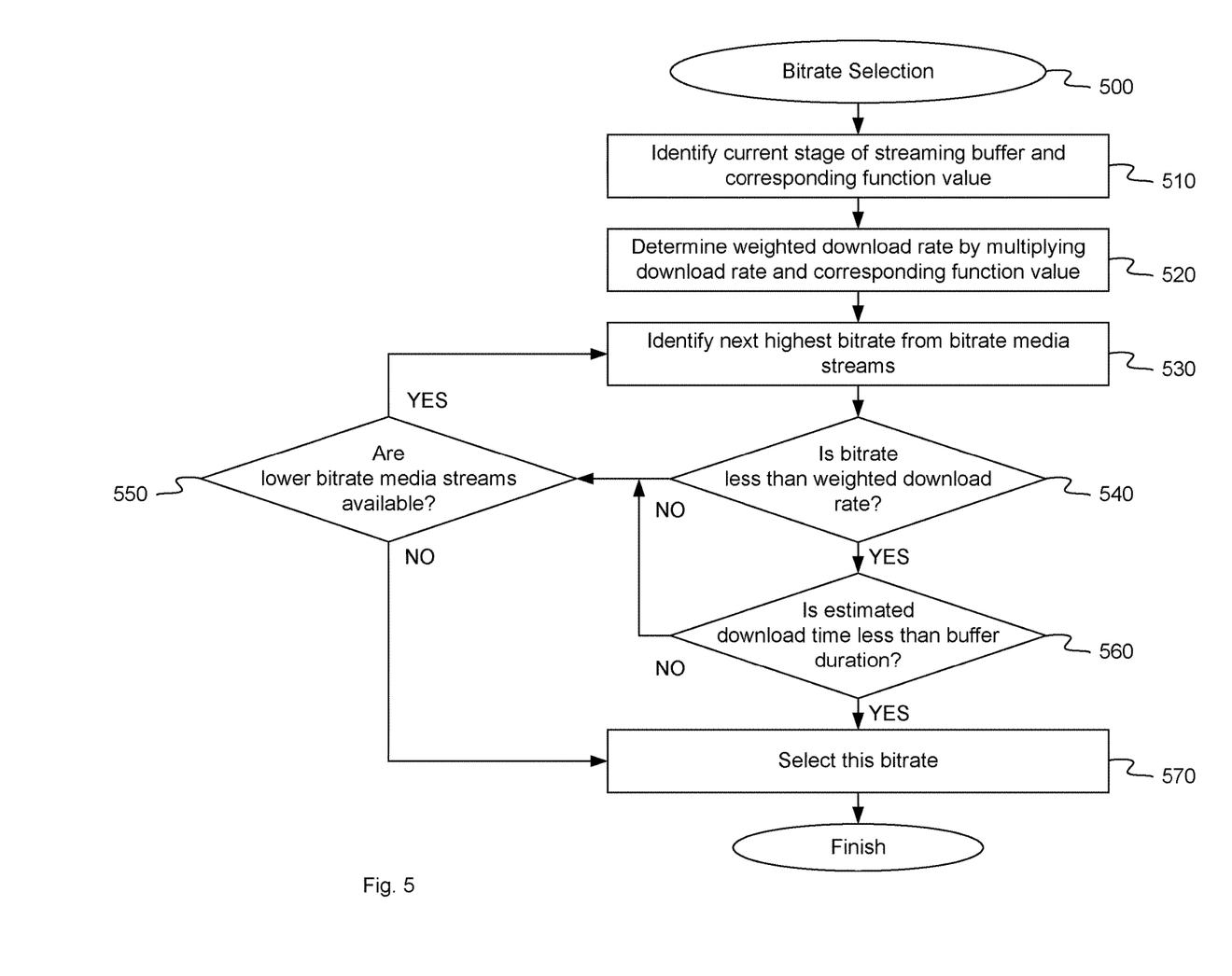
FIG. 5 is a flow diagram illustrating a method for selecting a bitrate in view of the estimated download time, according to some implementations.

FIG. 5 is a flow diagram illustrating a method for selecting a bitrate in view of the estimated download time, according to some implementations. The method 500 may be performed by processing logic that comprises hardware (e.g., circuitry, dedicated logic, programmable logic, microcode, etc.), software (e.g., instructions run on a processing device to perform hardware simulation), or a combination thereof. The method 500 can select a bitrate at which to download a next (or subsequent) chunk of a media file based on an estimated download time. In one implementation, method 500 may be performed by bitrate selector 116, as shown in FIGS. 1 and 2.

Referring to FIG. 5, at block 510, method 500 identifies a current stage of the streaming buffer 114 and identifies the corresponding function value. In one implementation, buffer monitoring module 210 can compare the buffer duration to one or more thresholds or bounds to determine a stage of the streaming buffer. In one implementation, there may be a lower bound used to designate an increasing stage and an upper bound used to designate a decreasing stage. If buffer monitoring module 210 determines that the buffer duration is less than the lower bound, the streaming buffer 114 can be said to be in the increasing stage. If the buffer duration is greater than the upper bound, the streaming buffer 114 can be said to be in the decreasing stage. If the buffer duration is between the lower bound and the upper bound, it can be said that the streaming buffer 114 is in a maintaining stage. The weighting may be based on the stage of the streaming buffer 114, as determined by buffer monitoring module 210. For example, the weighting factor may be 0.5 for the increasing stage, 1.0 for the maintaining stage, and 1.5 for the decreasing stage. In one implementation, buffer monitoring module 210 may lookup the weighting values from memory in user device 110. At block 520, method 500 determines the weighted download rate by multiplying the download rate and the corresponding function value. The values may be multiplied by download rate module 215.

At block 530, method 500 identifies a next highest bitrate from the available bitrate media streams 132, 134, 136. If this is the first pass through method 500, bitrate selection module 230 may identify the highest available bitrate stream. In subsequent passes, method 500 may step down sequentially to the next highest available bitrate stream.

At block 540, method 500 determines if the bitrate is less than the weighted download rate determined at block 520. In one implementation, bitrate selection module 230 compares the identified bitrate to the weighted download rate, as determined at block 520.

If at block 540, method 500 determines that the bitrate is not less than the weighted download rate, at block 550, method 500 determines if any lower bitrate media streams are available. If at block 540, method 500 determines that the bitrate is less than the weighed download rate, at block 560, method 500 determines if the estimated download time is less than the buffer duration. In one implementation, bitrate selection module 230 compares the estimated download time for the identified bitrate (as calculated by method 400 described above) to the buffer duration (as calculated by buffer monitoring module 210).

If at block 560, method 500 determines that the bitrate is not less than the weighted download rate, method 500 returns to block 550. If at block 560, method 500 determines that the bitrate is less than the weighted download rate, at block 570, method 500 selects the current bitrate for use in downloading the subsequent chunk of the media file. If no chunks satisfy the conditions at blocks 540 and 550, bitrate selection module 230 may select the lowest available bitrate.

Figure 6:
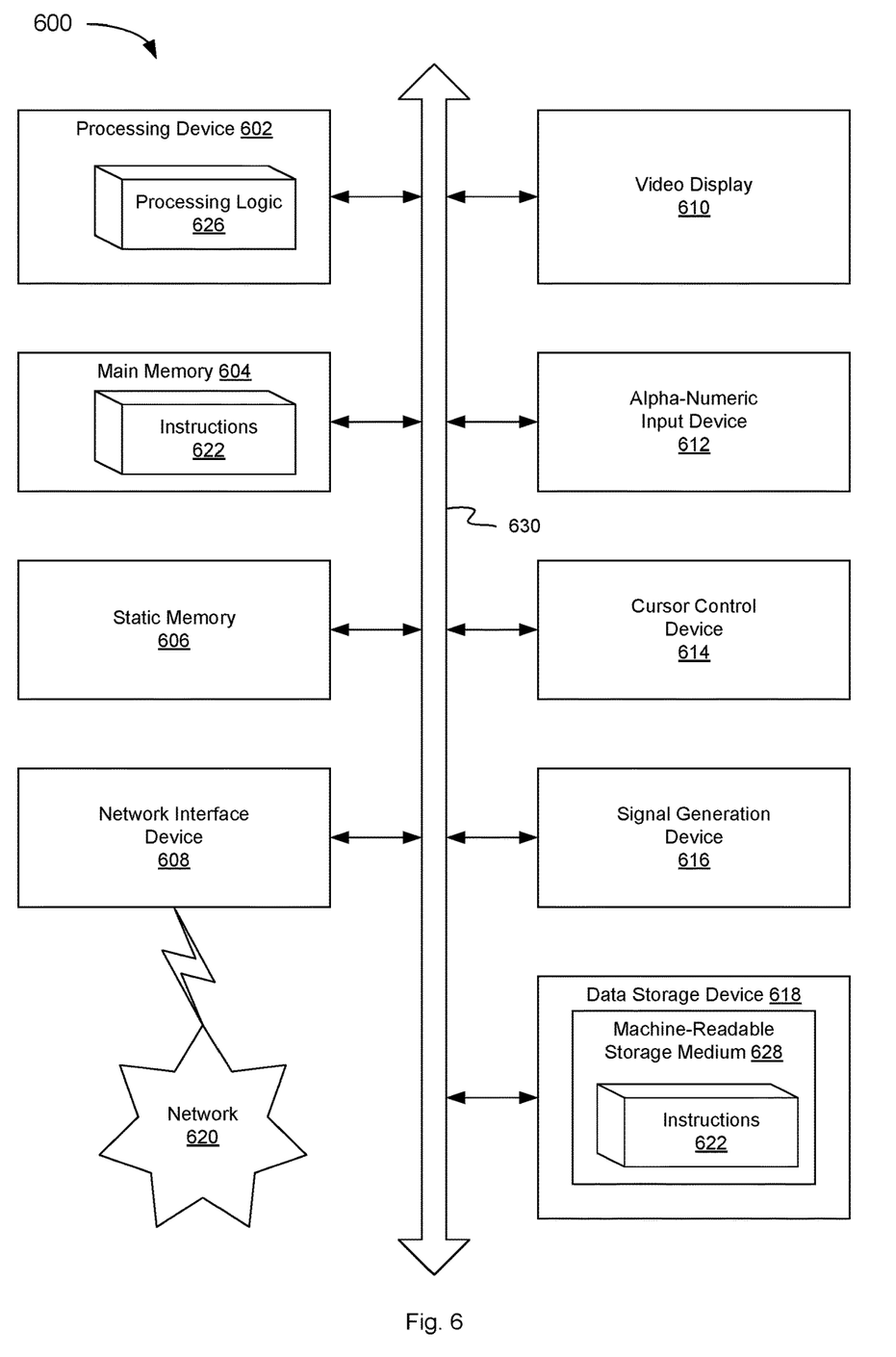
FIG. 6 is a block diagram illustrating an exemplary computer system, according to some implementations.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 600 may be representative of computing device, such as user device 110 running bitrate selector 116, or a server, such as web server 120, or media server 130.

In one implementation, the exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for dynamic bitrate selection for streaming media, as described herein. While the machine-readable storage medium 628 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementations included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   receiving, by a processing device, one or more chunks from a first media stream of a plurality of bitrate media streams of a media file at a streaming buffer of the processing device, the first media stream having a first bitrate, the plurality of bitrate media streams comprising a first subset of bitrate media streams including the first media stream and a second subset of bitrate media streams having a bitrate higher than the first bitrate;
   monitoring, by the processing device, a status of the streaming buffer by determining a buffer duration of the one or more chunks from the first media stream being buffered at the streaming buffer, wherein the determining of the buffer duration comprises determining a playing time of the one or more chunks from the first media stream being buffered at the streaming buffer;
   in response to determining that the buffer duration of the one or more chunks at the streaming buffer satisfies a threshold condition:
      for each bitrate media stream of the second subset of bitrate media streams, calculating, by the processing device, an expected download time for a subsequent chunk of the media file to be received at the streaming buffer in the each bitrate media stream;
   selecting, by the processing device, a bitrate media stream of the second subset of bitrate media streams based on expected download times calculated for the second subset of bitrate media streams and the playing time of the one or more chunks from the first media stream being buffered at the streaming buffer; and
   downloading, by the processing device, the subsequent chunk from the selected bitrate media stream.

2. The method of claim 1, wherein selecting the bitrate media stream of the second subset of bitrate media streams comprises:
   comparing an estimated download time for a bitrate media stream of the second subset of bitrate media streams with the playing time of the one or more chunks from the first media stream being buffered at the streaming buffer; and
   in response to determining that the estimated download time for the bitrate media stream of the second subset of bitrate media streams is less than the playing time of the of the one or more chunks from the first media stream being buffered at the streaming buffer, selecting the bitrate media stream of the second subset of bitrate media streams.

3. The method of claim 2, wherein selecting the bitrate media stream of the second subset of bitrate media streams further comprises selecting a highest bitrate from the second subset of bitrate media streams that is less than or equal to a weighted download rate of the subsequent chunk and for which the estimated download time is less than the playing time of the one or more chunks from the first media stream being buffered at the streaming buffer.

4. The method of claim 3, further comprising:
determining a stage of the streaming buffer by comparing the buffer duration of the chunks of the media file stored in the streaming buffer to a plurality of threshold values; and
determining the weighted download rate by applying a weighting value to a download rate of the subsequent chunk, the weighting value based on the stage of the streaming buffer.

5. The method of claim 1, wherein calculating the expected download time for the subsequent chunk of the media file to be received at the streaming buffer in the each bitrate media stream comprises:
determining a size of the subsequent chunk of the media file to be received at the streaming buffer;
determining a download rate of one or more previous chunks of the media file already downloaded; and
calculating the expected download time for the subsequent chunk of the media file based at least in part on the determined size of the subsequent chunk and the determined download rate of the one or more previous chunks of the media file already downloaded.

6. The method of claim 5, wherein determining the playing time of the one or more chunks from the first media stream being buffered at the streaming buffer comprises:
determining a playing time for each of the one or more chunks from the first media stream being buffered at the streaming buffer based on metadata for each of the one or more chunks from the first media stream being buffered at the streaming buffer; and
adding the determined playing time for all of the one or more chunks from the first media stream being buffered at the streaming buffer.

7. The method of claim 1, wherein receiving the one or more chunks from the first media stream of the plurality of bitrate media streams of the media file at the streaming buffer of the processing device comprises receiving metadata for each of the one or more chunks from the first media stream, the metadata comprising playing time for a respective chunk from the first media stream.

8. A system comprising:
a memory; and
a processing device, coupled to the memory, to:
receive one or more chunks from a first media stream of a plurality of bitrate media streams of a media file at a streaming buffer of the processing device, the first media stream having a first bitrate, the plurality of bitrate media streams comprising a first subset of bitrate media streams including the first media stream and a second subset of bitrate media streams having a bitrate higher than the first bitrate;
monitor a status of the streaming buffer by determining a buffer duration of the one or more chunks from the first media stream being buffered at the streaming buffer, wherein the determining of the buffer duration comprises determining a playing time of the one or more chunks from the first media stream being buffered at the streaming buffer;
in response to determining that the buffer duration of the one or more chunks at the streaming buffer satisfies a threshold condition, for each bitrate media stream of the second subset of bitrate media streams, calculate an expected download time for a subsequent chunk of the media file to be received at the streaming buffer in the each bitrate media stream;
select a bitrate media stream of the second subset of bitrate media streams based on expected download times calculated for the second subset of bitrate media streams and the playing time of the one or more chunks from the first media stream being buffered at the streaming buffer; and
download the subsequent chunk from the selected bitrate media stream.

9. The system of claim 8, wherein to select the bitrate media stream of the second subset of bitrate media streams, the processing device is to:
compare an estimated download time for a bitrate media stream of the second subset of bitrate media streams with the playing time of the one or more chunks from the first media stream being buffered at the streaming buffer; and
in response to determining that the estimated download time for the bitrate media stream of the second subset of bitrate media streams is less than the playing time of the of the one or more chunks from the first media stream being buffered at the streaming buffer, select the bitrate media stream of the second subset of bitrate media streams.

10. The system of claim 9, wherein to select the bitrate media stream of the second subset of bitrate media streams, the processing device is further to select a highest bitrate from the second subset of bitrate media streams that is less than or equal to a weighted download rate of the subsequent chunk and for which the estimated download time is less than the playing time of the one or more chunks from the first media stream being buffered at the streaming buffer.

11. The system of claim 10, wherein the processing device is further to:
determine a stage of the streaming buffer by comparing the buffer duration of the chunks of the media file stored in the streaming buffer to a plurality of threshold values; and
determine the weighted download rate by applying a weighting value to a download rate of the subsequent chunk, the weighting value based on the stage of the streaming buffer.

12. The system of claim 8, wherein to calculate the expected download time for the subsequent chunk of the media file to be received at the streaming buffer in the each bitrate media stream, the processing device is to:
determine a size of the subsequent chunk of the media file to be received at the streaming buffer;
determine a download rate of one or more previous chunks of the media file already downloaded; and
calculate the expected download time for the subsequent chunk of the media file based at least in part on the determined size of the subsequent chunk and the determined download rate of the one or more previous chunks of the media file already downloaded.

13. The system of claim 12, wherein to determine the playing time of the one or more chunks from the first media stream being buffered at the streaming buffer, the processing device is to:
determine a playing time for each of the one or more chunks from the first media stream being buffered at the streaming buffer based on metadata for each of the one or more chunks from the first media stream being buffered at the streaming buffer; and
add the determined playing time for all of the one or more chunks from the first media stream being buffered at the streaming buffer.

14. The system of claim 8, wherein to receive the one or more chunks from the first media stream of the plurality of bitrate media streams of the media file at the streaming buffer of the processing device, the processing device is to receive metadata for each of the one or more chunks from the first media stream, the metadata comprising playing time for a respective chunk from the first media stream.

15. A non-transitory machine-readable storage medium storing instructions which, when executed, cause a processing device to perform operations comprising:

receiving one or more chunks from a first media stream of a plurality of bitrate media streams of a media file at a streaming buffer of the processing device, the first media stream having a first bitrate, the plurality of bitrate media streams comprising a first subset of bitrate media streams including the first media stream and a second subset of bitrate media streams having a bitrate higher than the first bitrate;

monitoring a status of the streaming buffer by determining a buffer duration of the one or more chunks from the first media stream being buffered at the streaming buffer, wherein the determining of the buffer duration comprises determining a playing time of the one or more chunks from the first media stream being buffered at the streaming buffer;

in response to determining that the buffer duration of the one or more chunks at the streaming buffer satisfies a threshold condition, for each bitrate media stream of the second subset of bitrate media streams, calculating an expected download time for a subsequent chunk of the media file to be received at the streaming buffer in the each bitrate media stream;

selecting a bitrate media stream of the second subset of bitrate media streams based on expected download times calculated for the second subset of bitrate media streams and the playing time of the one or more chunks from the first media stream being buffered at the streaming buffer; and downloading the subsequent chunk from the selected bitrate media stream.

16. The non-transitory machine-readable storage medium of claim 15, wherein selecting the bitrate media stream of the second subset of bitrate media streams comprises:

comparing an estimated download time for a bitrate media stream of the second subset of bitrate media streams with the playing time of the one or more chunks from the first media stream being buffered at the streaming buffer; and in response to determining that the estimated download time for the bitrate media stream of the second subset of bitrate media streams is less than the playing time of the of the one or more chunks from the first media stream being buffered at the streaming buffer, selecting the bitrate media stream of the second subset of bitrate media streams.

17. The non-transitory machine-readable storage medium of claim 16, wherein selecting the bitrate media stream of the second subset of bitrate media streams further comprises selecting a highest bitrate from the second subset of bitrate media streams that is less than or equal to a weighted download rate of the subsequent chunk and for which the estimated download time is less than the playing time of the one or more chunks from the first media stream being buffered at the streaming buffer.

18. The non-transitory machine-readable storage medium of claim 15, wherein calculating the expected download time for the subsequent chunk of the media file to be received at the streaming buffer in the each bitrate media stream comprises:

determining a size of the subsequent chunk of the media file to be received at the streaming buffer;

determining a download rate of one or more previous chunks of the media file already downloaded; and calculating the expected download time for the subsequent chunk of the media file based at least in part on the determined size of the subsequent chunk and the determined download rate of the one or more previous chunks of the media file already downloaded.

19. The non-transitory machine-readable storage medium of claim 18, wherein determining the playing time of the one or more chunks from the first media stream being buffered at the streaming buffer comprises:

determining a playing time for each of the one or more chunks from the first media stream being buffered at the streaming buffer based on metadata for each of the one or more chunks from the first media stream being buffered at the streaming buffer; and adding the determined playing time for all of the one or more chunks from the first media stream being buffered at the streaming buffer.

20. The non-transitory machine-readable storage medium of claim 15, wherein receiving the one or more chunks from the first media stream of the plurality of bitrate media streams of the media file at the streaming buffer of the processing device comprises receiving metadata for each of the one or more chunks from the first media stream, the metadata comprising playing time for a respective chunk from the first media stream.

* * * * *